United States Patent
Gosla et al.

(10) Patent No.: US 9,870,281 B1
(45) Date of Patent: Jan. 16, 2018

(54) POWER LOSS MITIGATION FOR DATA STORAGE DEVICE

(71) Applicant: Western Digital Technologies, Inc., Irvine, CA (US)

(72) Inventors: Asif F. Gosla, Irvine, CA (US); Scott E. Burton, Westminster, CO (US); Chiranjeb Mondal, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 14/664,674

(22) Filed: Mar. 20, 2015

(51) Int. Cl.
G06F 11/00 (2006.01)
G06F 11/07 (2006.01)

(52) U.S. Cl.
CPC ........ G06F 11/0793 (2013.01); G06F 11/073 (2013.01)

(58) Field of Classification Search
CPC .............. G06F 11/0727; G06F 11/073; G06F 11/0793; G06F 11/1008; G06F 11/1402; G06F 11/1441
See application file for complete search history.

(56) References Cited

U.S. PATENT DOCUMENTS

| | | | |
|---|---|---|---|
| 3,810,116 A * | 5/1974 | Prohofsky | G06F 11/1441 365/228 |
| 5,448,719 A | 9/1995 | Schultz et al. | |
| 5,818,654 A * | 10/1998 | Reddy | G11B 20/1883 360/48 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |

(Continued)

OTHER PUBLICATIONS

Asif F. Gosla, et al., U.S. Appl. No. 14/639,555, filed Mar. 5, 2015, 25 pages.

*Primary Examiner* — Joshua P Lottich (74) *Attorney, Agent, or Firm* — Barry IP Law (57) ABSTRACT

A Data Storage Device (DSD) includes a disk for storing data, a volatile memory for temporarily storing data to be written on the disk, and a Non-Volatile Solid-State Memory (NVSM) for storing data. Data is stored in the volatile memory in preparation for writing the data on the disk. The data is written from the volatile memory onto the disk, and it is determined whether the data written on the disk is qualified as written. In the event of an unexpected power loss, a portion of unqualified data that has not been qualified as written is transferred from the volatile memory to the NVSM.

30 Claims, 7 Drawing Sheets

(56) References Cited

U.S. PATENT DOCUMENTS

| | | |
|---|---|---|
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,725,397 B1 * | 4/2004 | Emberty .............. G06F 11/1441 711/E12.04 |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |

(56) References Cited

U.S. PATENT DOCUMENTS

| | | |
|---|---|---|
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |

(56) References Cited

U.S. PATENT DOCUMENTS

| | | |
|---|---|---|
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina |
| 8,683,295 B1 | 3/2014 | Syu |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2002/0156983 A1* | 10/2002 | Jones .................. G06F 11/1441 711/143 |
| 2005/0071537 A1* | 3/2005 | New ...................... G06F 3/0608 711/100 |
| 2005/0117418 A1* | 6/2005 | Jewell ................ G06F 11/1441 365/202 |
| 2005/0177652 A1* | 8/2005 | Cumpson ................ H04N 5/775 710/15 |
| 2007/0220227 A1* | 9/2007 | Long ................... G06F 11/1441 711/165 |
| 2009/0113702 A1 | 5/2009 | Hogg |
| 2009/0193189 A1* | 7/2009 | Carswell ............. G06F 11/1441 711/113 |
| 2010/0053796 A1* | 3/2010 | Boyle ...................... G11B 5/09 360/75 |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0070363 A1* | 3/2013 | Bennett ................ G11B 19/041 360/73.03 |
| 2013/0308433 A1* | 11/2013 | Yulizar ................... G11B 27/36 369/53.41 |
| 2014/0201424 A1 | 7/2014 | Chen et al. |
| 2014/0359399 A1* | 12/2014 | Francis ............... G06F 11/0727 714/773 |
| 2015/0039824 A1* | 2/2015 | Furlong ............... G06F 12/0868 711/113 |
| 2015/0046747 A1* | 2/2015 | Gaertner ............. G06F 11/1666 714/6.11 |
| 2015/0293715 A1* | 10/2015 | Ishii ..................... G06F 3/0619 360/51 |

* cited by examiner

POWER LOSS MITIGATION FOR DATA STORAGE DEVICE

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk, such as in a Hard Disk Drive (HDD). Another type of storage media can include a solid-state memory where cells are charged to store data.

In writing data to a disk, an unexpected power loss can cause an incomplete write of data to a sector in a track. Data in the sector is then typically not readable after the incomplete write and the data is usually lost after the unexpected power loss.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
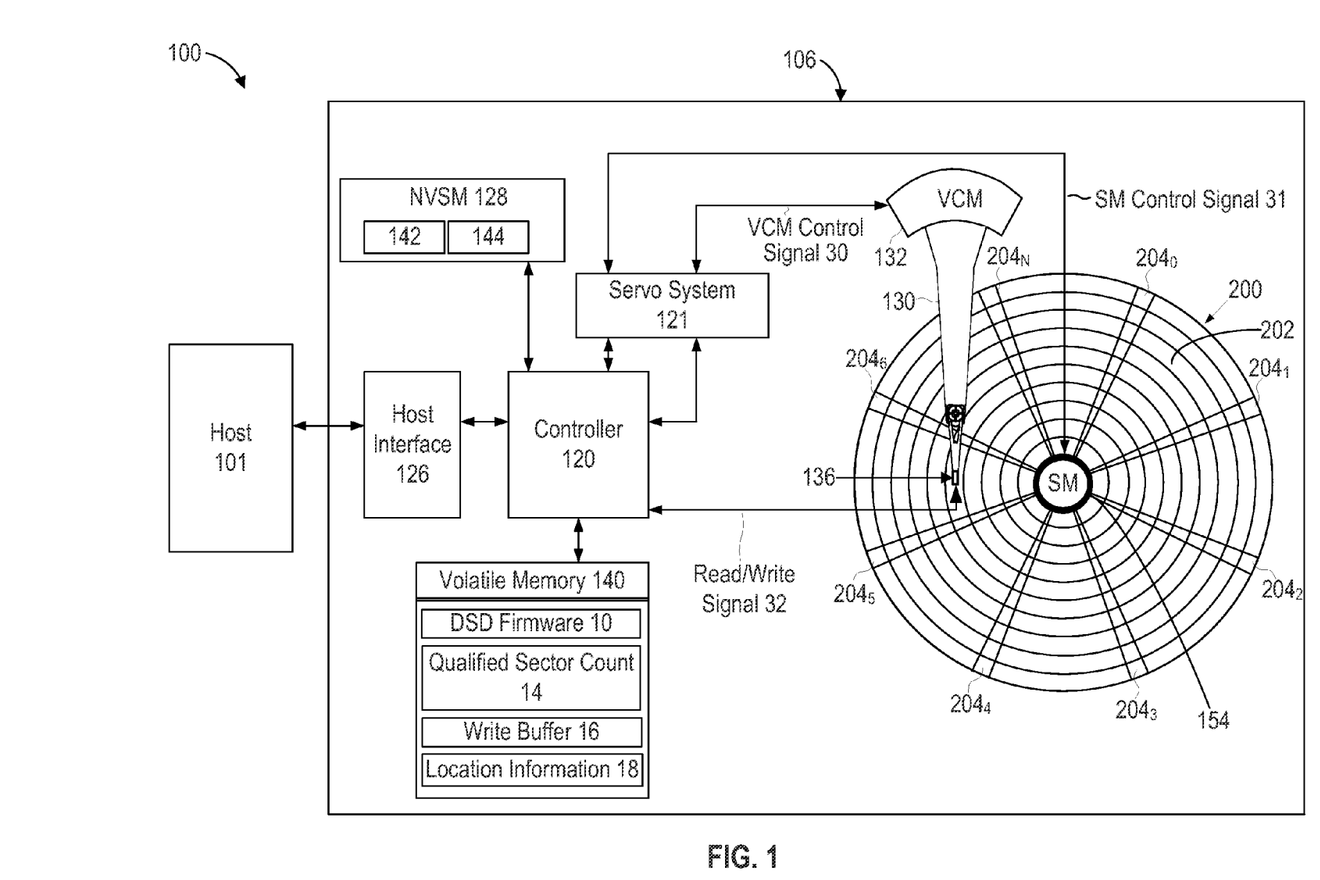
FIG. 1 is a block diagram depicting a Data Storage Device (DSD) according to an embodiment.

FIG. 1 depicts a block diagram of Data Storage Device (DSD) 106 according to an embodiment where DSD 106 includes Non-Volatile Memory (NVM) in the form of rotating magnetic disk 200 and Non-Volatile Solid-State Memory (NVSM) 128. In this regard, DSD 106 can be considered a Solid-State Hybrid Drive (SSHD) since it includes both solid-state and disk media. In other embodiments, each of disk 200 or NVSM 128 may be replaced by multiple Hard Disk Drives (HDDs) or multiple Solid-State Drives (SSDs), respectively, so that DSD 106 includes pools of HDDs and/or SSDs. Other embodiments may include different components than those shown in FIG. 1.

DSD 106 includes controller 120 which includes circuitry such as one or more processors for executing instructions and can include a microcontroller, a DSP, an Application-Specific Integrated Circuit (ASIC), a Field-Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, Serial Advanced Technology Attachment (SATA), PCI express (PCIe), Small Computer System Interface (SCSI), or Serial Attached SCSI (SAS). As will be appreciated by those of ordinary skill in the art, host interface 126 can be included as part of controller 120. Although FIG. 1 depicts the co-location of host 101 and DSD 106, in other embodiments the two need not be physically co-located. In such embodiments, DSD 106 may be located remotely from host 101 and connected to host 101 via a network interface.

In the example of FIG. 1, disk 200 is rotated by a Spindle Motor (SM) 154 and head 136 is positioned to read and write data on the surface of disk 200. In more detail, head 136 is connected to the distal end of actuator 130 which is rotated by Voice Coil Motor (VCM) 132 to position head 136 over disk 200 to read or write data in tracks 202.

As shown in FIG. 1, disk 200 includes a number of radially spaced, concentric tracks 202 for storing data. In some implementations, tracks 202 may be written using Shingled Magnetic Recording (SMR) such that tracks 202 overlap. In other implementations, tracks 202 may not overlap or disk 200 may include both overlapping and non-overlapping tracks 202. Disk 200 also includes servo wedges $204_0$ to $204_N$ that are used to control the position of head 136 in relation to disk 200.

Figure 2:
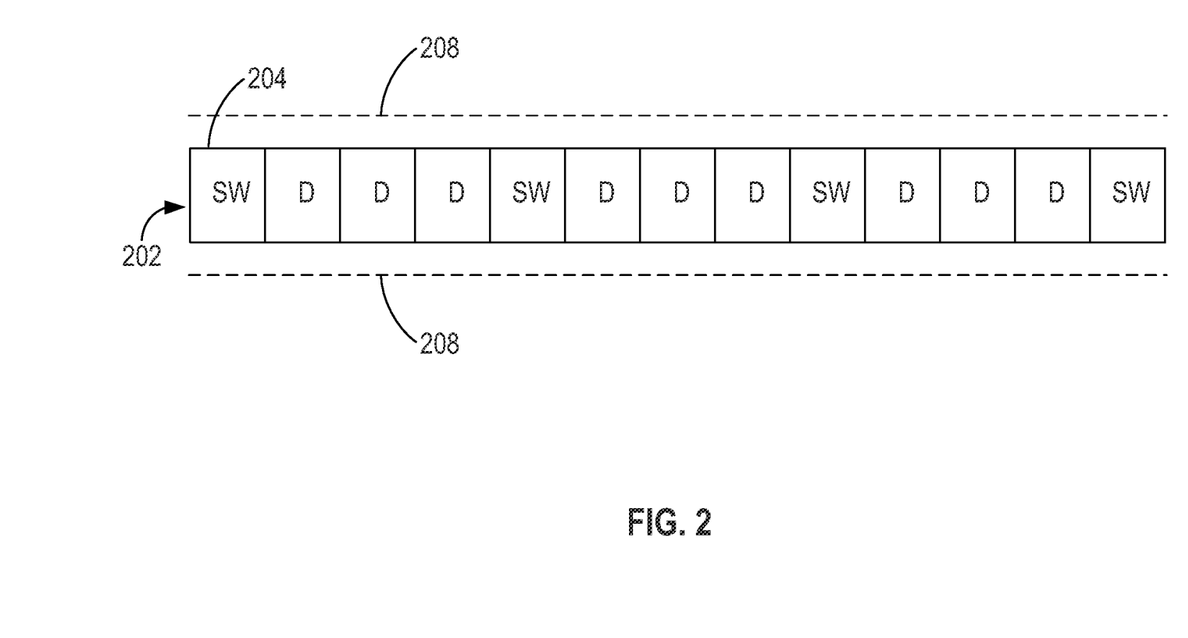
FIG. 2 is a diagram depicting a track on a disk according to an embodiment.

Servo system 121 controls the rotation of disk 200 with SM control signal 31 and controls the position of head 136 with VCM control signal 30. In more detail, FIG. 2 illustrates an example of a track 202 on disk 200 that includes servo wedges 204 spaced every four sectors as indicated by the servo wedge sectors with "SW" and user data sectors indicated with a "D." Each servo wedge 204 may include servo information that can be read from disk 200 by head 136 to determine the position of head 136 over disk 200. For example, each servo wedge may include a pattern of alternating magnetic transitions (a servo burst), which may indicate a particular wedge number on disk 200.

FIG. 2 also depicts write unsafe thresholds 208 with dashed lines that are a threshold distance from the center of track 202. In other embodiments, write unsafe thresholds in addition to write unsafe thresholds 208 can be used to provide different margins of deviation from the center of track 202 when writing data.

In the example of FIG. 2, if head 136 travels outside of write unsafe thresholds 208 while writing data, head 136 will stop or abort writing data and treat the write as a write error. Such deviation from track 202 may occur, for example, during a vibration condition of DSD 106 or during a mechanical shock event of DSD 106.

Returning to FIG. 1, DSD 106 also includes NVSM 128 for storing data across power cycles. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. In FIG. 1, NVSM 128 includes first segment 142 and second segment 144, which can be used to store different instances of unqualified data from volatile memory 140, as discussed in more detail below with reference to the processes of FIGS. 5 and 6.

DSD 106 includes volatile memory 140, which can include, for example, a Dynamic Random Access Memory (DRAM). Volatile memory 140 can be used by DSD 106 to temporarily store data. Data stored in volatile memory 140 can include data read from NVM such as disk 200 or NVSM 128, data to be stored in NVM, instructions loaded from DSD firmware 10 for execution by controller 120, and/or data used in executing DSD firmware 10. Volatile memory 140 can also be used to temporarily store data for write commands intended for disk 200 in write buffer 16.

As discussed in more detail below, certain data stored in volatile memory 140 may have been in the process of being written on disk 200 at the time of an unexpected power loss and could be at risk of causing a write splice (i.e., a corrupted data sector on the disk) after the unexpected power loss. In addition, this unqualified data is also at risk of being lost after an unexpected power loss. The present disclosure therefore includes transferring to NVSM 128 a portion of unqualified data that has not been qualified as written on disk 200 in the event of an unexpected power loss. In some implementations, servo system 121 can be used to qualify data written on disk 200 by providing an indication of whether the data was written within a threshold distance from a center of a track 202 on disk 200 (e.g., within write unsafe thresholds 208 in FIG. 2).

In one implementation, data for performing host write commands is stored in write buffer 16 and a portion of the unqualified data from write buffer 16 is identified or marked through the use of a flag or other indicator as being unqualified data that is at risk of causing a write splice (i.e., a corrupted sector). Such unqualified data can include data that has not been qualified as written between a current servo wedge 204 and a next servo wedge 204. Location information 18 stored in volatile memory 140 can include a current servo wedge number indicating the last servo wedge 204 read by head 136. Controller 120 can then indicate that the unqualified data following the current servo wedge to a next servo wedge is at risk of causing a write splice. In other implementations, the unqualified data at risk can include unqualified data from the current servo wedge up to a different number of following servo wedges such as unqualified data up to the next two servo wedges. In addition, controller 120 maintains qualified sector count 14 to indicate which data stored in write buffer 16 is qualified data. In more detail, qualified sector count 14 can provide a count of sectors written on disk 200 that have been qualified as written.

Controller 120 can then transfer the unqualified data at risk of causing a write splice to NVSM 128 after an unexpected power loss so that the unqualified data can be correctly written after powering up. In one implementation, kinetic energy from the rotation of SM 154 can be used to temporarily power NVSM 128 to facilitate the transfer of unqualified data from volatile memory 140 to NVSM 128. The transfer of data to NVSM 128 ordinarily reduces later uncorrectable read errors caused by write splices formed by writing during an unexpected power loss. In addition, the unqualified data transferred to NVSM 128 is ordinarily protected from being lost after the power loss.

In normal operation, host interface 126 receives host read and write commands from host 101 for reading data from and writing data to NVM. In response to a write command from host 101, controller 120 may buffer the data to be written for the write commands in write buffer 16.

For data to be written on disk 200, a read/write channel (not shown) of controller 120 may encode the buffered data into write signal 32 which is provided to head 136 for magnetically writing data on disk 200. Servo system 121 can provide VCM control signal 30 to VCM 132 to position head 136 over a particular track 202 for writing the data. Servo wedges 204 may be read from disk 200 to provide servo system 121 with feedback for positioning head 136 in relation to disk 200.

In response to a read command for data stored on disk 200, servo system 121 positions head 136 over a particular track 202. Controller 120 controls head 136 to magnetically read data stored in the track and to send the read data as read signal 32. A read/write channel of controller 120 can then decode and buffer the data into volatile memory 140 for transmission to host 101 via host interface 126. In addition, servo wedges 204 can be read from disk 200 to provide feedback to servo system 121 for positioning head 136 in relation to disk 200.

For data to be stored in NVSM 128, controller 120 receives data from host interface 126 and may buffer the data in volatile memory 140. In one implementation, the data is then encoded into charge values for charging cells (not shown) of NVSM 128 to store the data.

In response to a read command for data stored in NVSM 128, controller 120 in one implementation reads current values for cells in NVSM 128 and decodes the current values into data that can be transferred to host 101 via host interface 126.

Write Splice Mitigation Examples

Figure 3A:
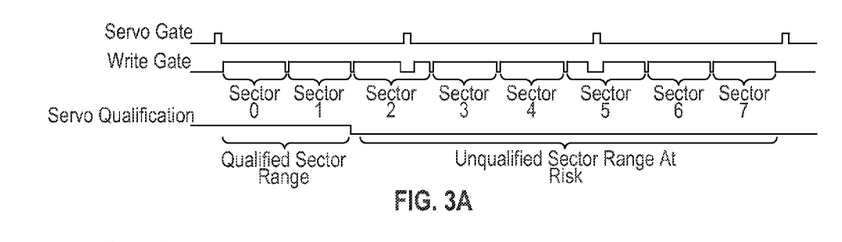
FIG. 3A is a diagram depicting a portion of an unqualified sector range according to an embodiment.

FIG. 3A is a diagram depicting an unqualified sector range that is at risk according to an embodiment. In the example of FIG. 3A, sectors 0 to 7 are written to disk 200 under a write gate. While writing the sectors, servo system 121 determines a position of head 136 with respect to track 202 during a servo gate and makes adjustments to VCM control signal 30 to better align head 136 with the center of track 202. As discussed above, this can be accomplished by reading servo wedges 204 during the servo gate and using position information recorded in servo wedges 204 to determine a relative position of head 136. Based on a current position of head 136, servo system 121 qualifies that the sectors following a previous servo wedge 204 were within a data track tolerance (e.g., within write unsafe thresholds 208 in FIG. 2). The qualification of sectors generally lags the writing of sectors by one or more servo wedges 204.

In the example of FIG. 3A, sectors 0 and 1 have been qualified as written on disk 200 and form part of a qualified sector range. Sectors 2 to 7 have been written on disk 200 but have not yet been qualified as written so they form an unqualified sector range at risk that may include a write splice. If the data for a sector has been successfully written within the threshold distance, the sector is qualified and an indication is provided to controller 120 to update qualified sector count 14.

Figure 3B:
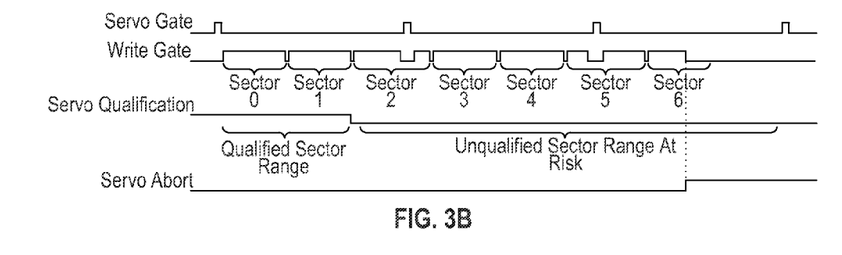
FIG. 3B is a diagram depicting a write abort in a portion of an unqualified sector range according to an embodiment.

FIG. 3B provides an example where the writing of sector 6 in the unqualified sector range at risk is aborted according to an embodiment. The halting of the write gate could have occurred due to head 136 traveling outside of write unsafe thresholds 208. Sector 6 then contains a write splice since writing data to the sector was interrupted. If a power loss were to occur in a conventional DSD before the data of sector 6 is successfully written on disk 200 during a write retry, the data of sector 6 may cause an uncorrectable read error since the data for this sector remains in an unreadable sector. The present disclosure therefore transfers the unqualified data at risk from volatile memory 140 to NVSM 128 in the event of an unexpected power loss to protect against uncorrectable read errors and data loss that may otherwise occur due to an incomplete write in a sector.

Figure 3C:
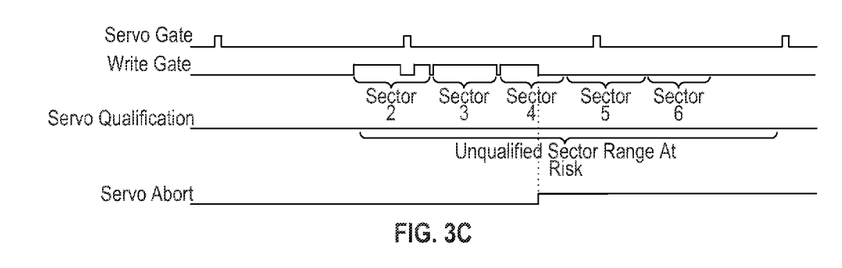
FIG. 3C is a diagram depicting a write retry of the portion of the unqualified sector range of FIG. 3B according to an embodiment.

If there is not an unexpected power loss, DSD 106 may attempt a write retry to write the unqualified sector range of sectors 2 to 6. FIG. 3C is an example of a write retry of the unqualified sector range according to an embodiment. In attempting the write retry, head 136 waits until disk 200 returns to the previously attempted location on disk 200 for writing the unqualified sector range. The wait for head 136 to return to the previously attempted location can add to the vulnerability of the data to be written in sector 6 since it prolongs the time in which an unexpected power loss could occur. In addition, certain types of disk defects can cause some DSDs to attempt multiple write retries if the first write retry is unsuccessful.

In the example of FIG. 3C, another write splice occurs when trying to rewrite the unqualified sector range that is at risk. This time, the write is aborted in sector 4, which now also contains a write splice. The data in sectors 4 and 6 are now vulnerable since they have not been properly recorded in NVM yet. DSD 106 may make a predetermined number of write retries (e.g., three write retries) before reporting a write error and writing the unqualified data in another portion of NVM. As discussed in more detail below, the present disclosure provides for power safe protection of the data in the unqualified sector range at risk by transferring this unqualified data from volatile memory 140 to NVSM 128 in the event of an unexpected power loss.

Figure 4:
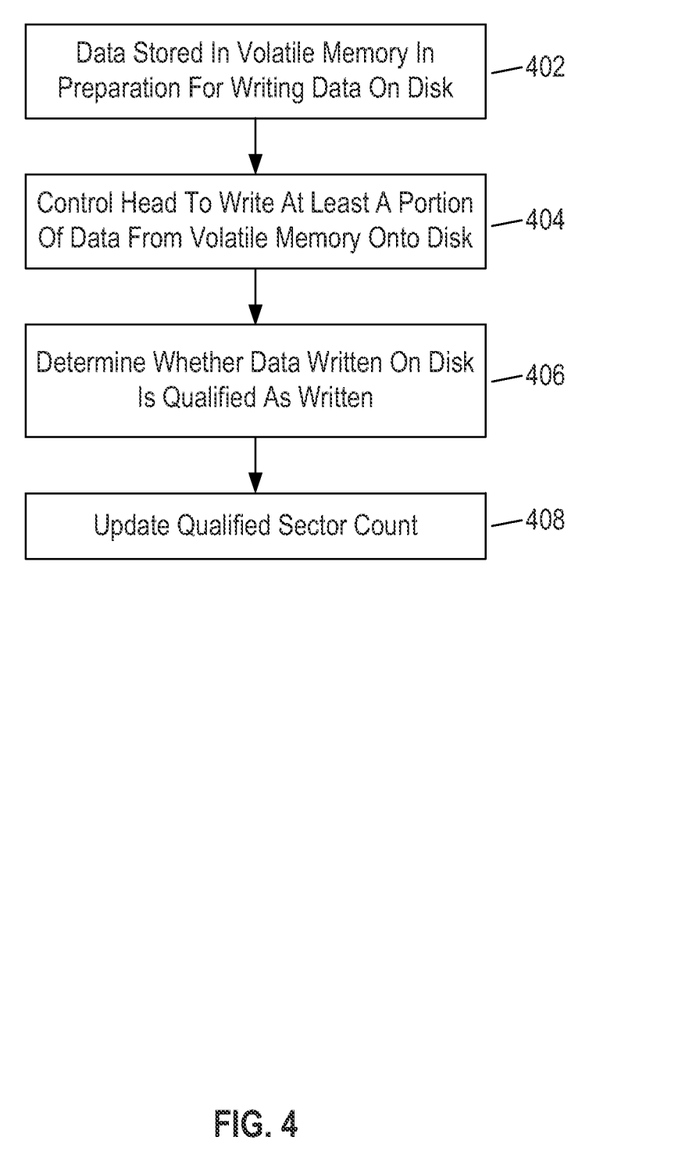
FIG. 4 is a flowchart for a disk write process according to an embodiment.

FIG. 4 is a flowchart for a disk write process that can be performed by controller 120 executing DSD firmware 10 according to an embodiment. In block 402 data is stored in volatile memory 140 such as in write buffer 16 in preparation for writing the data on disk 200. In block 404, controller 120 controls head 136 via servo system 121 to write at least a portion of the data stored in volatile memory 140 on disk 200.

In block 406, controller 120 determines whether the data written on disk 200 is qualified as written. As discussed above, controller 120 may determine whether data is qualified as written based on an indication from servo system 121 indicating whether the data was written within a threshold distance from a center of a track on disk 200.

In block 408, controller 120 updates qualified sector count 14 to indicate a number of sectors qualified as written on disk 200 for data stored in write buffer 16. In other embodiments, controller 120 may instead keep track of the number of sectors written on disk 200 that remain unqualified. As discussed below with reference to FIG. 5, the qualified sector count 14 can be used by controller 120 during a power loss to determine which data stored in volatile memory 140 is unqualified.

Figure 5:
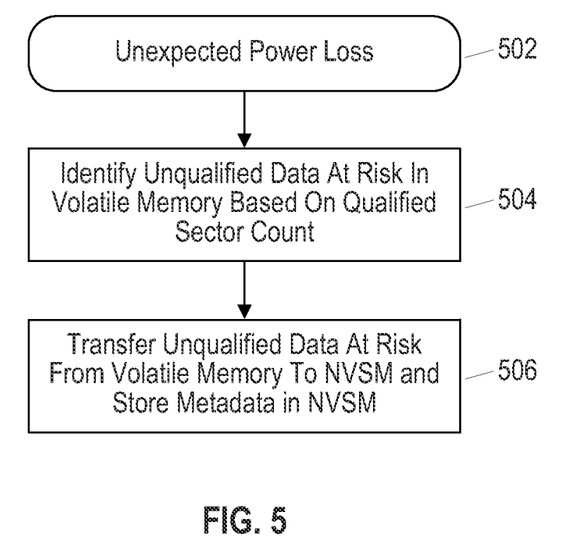
FIG. 5 is a flowchart for a power loss process according to an embodiment.

FIG. 5 is a flowchart for a power loss process that can be performed by controller 120 executing DSD firmware 10 according to an embodiment. In block 502, an unexpected power loss occurs at DSD 106. An indication of a power loss can come from, for example, a notification from host 101, monitoring of a power supply of DSD 106, or an indication from power supply circuitry of DSD 106.

In block 504, controller 120 identifies unqualified data stored in write buffer 16 of volatile memory 140 based on qualified sector count 14. The identification may include, for example, flagging data corresponding to the unqualified sector range.

In block 506, the unqualified data is transferred from volatile memory 140 to first segment 142 or second segment 144 of NVSM 128 together with metadata for the unqualified data. The metadata can indicate, for example, logical addresses for identifying the data and its intended location on disk 200. Other embodiments may not transfer metadata to NVSM 128.

As noted above, kinetic energy from a rotation of spindle motor 154 can power NVSM 128 and/or volatile memory 140 long enough to facilitate the transfer of the unqualified data. In other embodiments, controller 120 may keep a running identification of the unqualified data in volatile memory 140 rather than identifying the unqualified data at the time of power loss.

Figure 6:
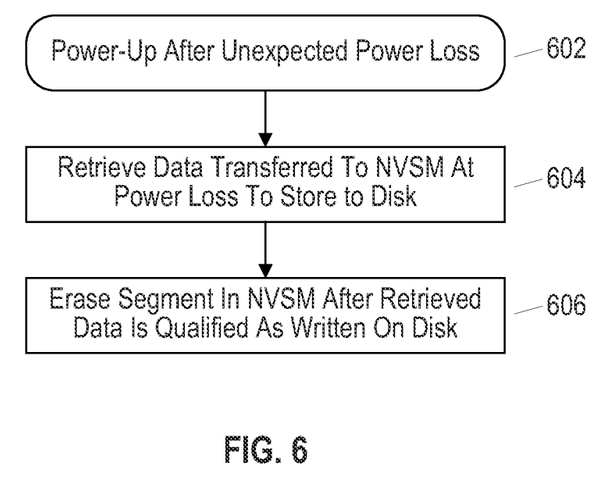
FIG. 6 is a flowchart for a power-up process according to an embodiment.

FIG. 6 is a flowchart for a power-up process that can be performed by controller 120 executing DSD firmware 10 according to an embodiment. In block 602, DSD 106 is powered-up after an unexpected power loss. In block 604, controller 120 retrieves unqualified data that was transferred to NVSM 128 from volatile memory 140 after the power loss. In some implementations, controller 120 controls head 136 to write the retrieved data on disk 200 before performing any commands involving the data so as to maintain coherency of the unqualified data. Controller 120 may also wait until the retrieved data has been qualified as written on disk 200 before performing any commands involving the data.

In block 606, one of segment 142 or 144 of NVSM 128 is erased after the unqualified data retrieved in block 604 has been qualified as written on disk 200. This can ordinarily ensure that there is space available in either first segment 142 or second segment 144 to quickly store unqualified data in the event of another unexpected power loss.

Power Safe Runt Processing Examples

Figure 7A:
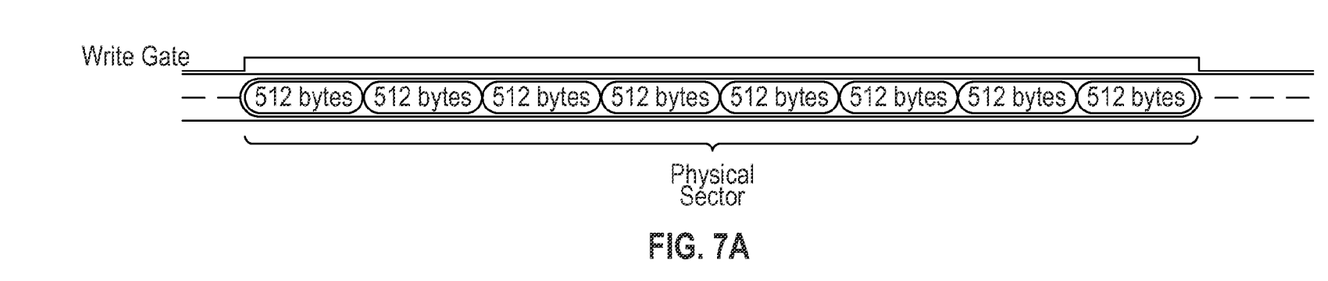
FIG. 7A illustrates an example of a physical sector written in a 512e format according to an embodiment.

FIG. 7A illustrates an example of a physical sector written in 512e format according to an embodiment. The 512e format can allow for larger physical sectors such as 4,096 byte sectors while accommodating a logical sector size of 512 bytes that is commonly used by most hosts. As shown in FIG. 7A, a physical sector includes eight logical sectors of 512 bytes written during a write gate.

In cases where new data to be written to disk 200 is not large enough to fill a full physical sector, controller 120 can use data from other sectors called runt data to fill in the remaining portion of the physical sector. In a case where there is an unexpected power loss while writing the physical sector, the runt data or both the runt data and the new data can become vulnerable to data loss in a conventional DSD.

Figure 7B:
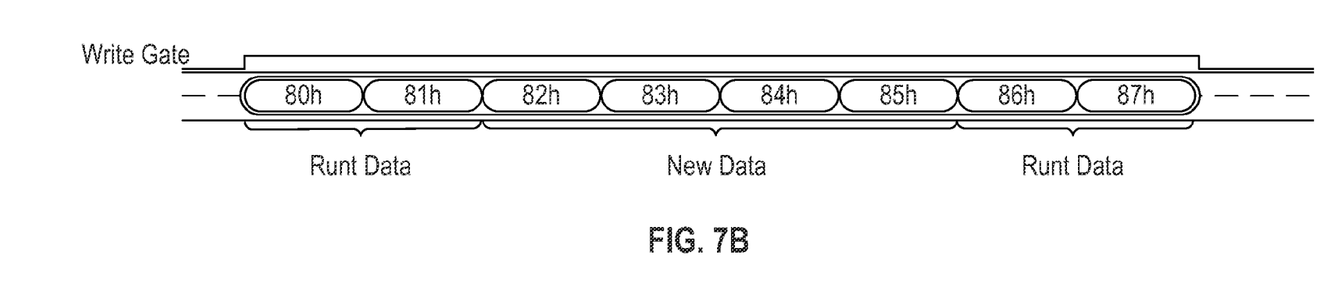
FIG. 7B illustrates an example of a physical sector including new data and runt data according to an embodiment.

FIG. 7B illustrates an example of a physical sector including new data and runt data according to an embodiment. As shown in FIG. 7B, logical sectors addressed logically as 82h to 85h include new data that does not fill the full physical sector since it is only four logical sectors. The new data can be part of a write command received from host 101 via host interface 126 to write the new data on disk 200. In other situations, the new data can be dirty data stored in NVSM 128 that is to be flushed to disk 200. In yet other situations, the new data can be data stored in a media based cache of disk 200 such as a zone of tracks 202 that is used to quickly access data.

In the example of FIG. 7B, runt data is added at logical sectors addressed as 80h, 81h, 86h, and 87h to fill the physical sector. The runt data includes data that was previously written on disk 200 and is relocated to the physical sector with the new data to fill the physical sector. After reading the runt data from disk 200, the runt data is stored in volatile memory 140 in write buffer 16. The new data may also be stored in write buffer 16 before writing the new data in the physical sector depending on how the new data is accessed.

Figure 7C:
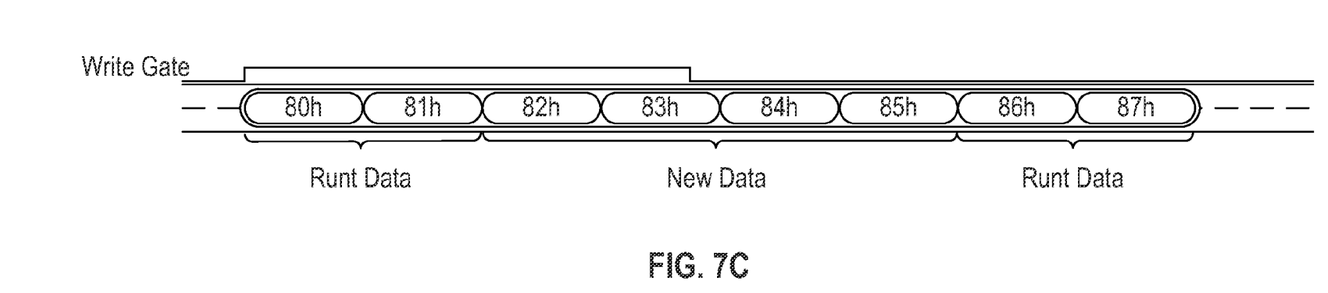
FIG. 7C illustrates an example of an interruption while writing the physical sector of FIG. 7B according to an embodiment.

FIG. 7C illustrates an example of an interruption while writing the physical sector of FIG. 7B according to an embodiment. As shown by the write gate in FIG. 7C, writing is interrupted while writing data for the logical sector 83h. The interruption can come from an unexpected power loss at DSD 106.

In such an example, the runt data and possibly the new data can be lost and the entire physical sector usually becomes unreadable if it is only partially written (i.e., a write splice). In addition, the runt data becomes missing or cannot be located if there is an unexpected power loss while writing the physical sector since the logical address for the runt data has been mapped to the new physical sector at the time of writing.

In view of the foregoing, the runt data stored in write buffer 16 is transferred from volatile memory 140 to NVSM 128 in the event of an unexpected power loss before the data is qualified as written in the physical sector. Any new data stored in write buffer 16 can also be transferred to NVSM 128 in the event of an unexpected power loss. In the case where the new data is dirty data flushed from NVSM 128 or where the new data remains stored in a media based cache of disk 200, some implementations may not store the new data in volatile memory 140. In such implementations, only the runt data stored in volatile memory 140 is transferred to NVSM 128 during an unexpected power loss. In the case where a write command is received from host 101, the new data will likely be stored in volatile memory 140 with the runt data and would therefore be transferred to NVSM 128 in the event of an unexpected power loss.

Figure 8:
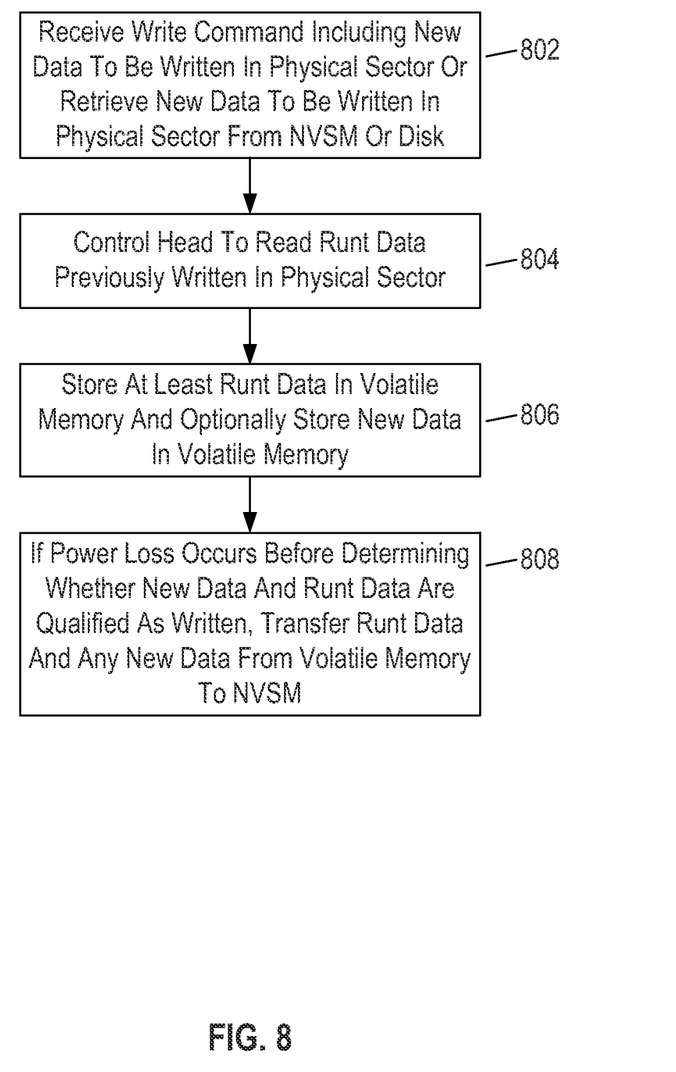
FIG. 8 is a flow chart for a write process for writing new data and runt data in a physical sector according to an embodiment.

FIG. 8 is a flow chart for a write process that can be performed by controller 120 executing DSD firmware 10 for writing new data and runt data in a physical sector according to an embodiment. In block 802, a write command is received including new data to be written in a physical sector or new data is retrieved by controller 120 from NVSM 128 or disk 200.

In block 804, controller 120 controls head 136 to read runt data previously written on disk 200 in a physical sector. In block 806, at least the runt data is stored in volatile memory 140 such as in write buffer 16. As noted above, the new data may also be stored in volatile memory 140 with the runt data.

In block 808, controller 120 transfers the runt data and any new data from volatile memory 140 to NVSM 128 if a power loss occurs before determining whether the new data and the runt data are qualified as written in the physical sector. The qualification can, for example, be performed by servo system 121 which can determine whether the new data and runt data in the physical sector have been written within a threshold distance from a center of a track. The write process of FIG. 8 then ends.

After powering up following a power loss, the transferred data can be written to disk 200 before performing any commands involving the new data or the runt data. This can ordinarily ensure consistency in the data written on disk 200.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
   a disk for storing data;
   a head for writing data on the disk;
   a volatile memory for temporarily storing data to be written on the disk;
   a Non-Volatile Solid-State Memory (NVSM) for storing data;
   a servo system for controlling a position of the head in relation to the disk; and
   a controller configured to:
      store data in the volatile memory in preparation for writing the data on the disk;
      control the head to write data from the volatile memory onto the disk;
      determine whether data written on the disk is qualified as written based on an indication from the servo system; and
      in the event of an unexpected power loss, transfer a portion of unqualified data from the volatile memory to the NVSM, wherein the unqualified data has not been qualified as written.

2. The DSD of claim 1, further comprising a spindle motor configured to rotate the disk, wherein kinetic energy from a rotation of the spindle motor powers the NVSM after the unexpected power loss so as to facilitate the transfer of the unqualified data from the volatile memory to the NVSM.

3. The DSD of claim 1, wherein the controller is further configured to maintain an indication of which data stored in the volatile memory is qualified data.

4. The DSD of claim 3, wherein the controller is further configured to:
   control the head to write data from the volatile memory in sectors on the disk; and
   maintain the indication of which data stored in the volatile memory is qualified data by keeping a count of sectors written on the disk that have been qualified as written.

5. The DSD of claim 1, wherein the indication from the servo system indicates whether the data was written within a threshold distance from a center of a track on the disk.

6. The DSD of claim 1, wherein the unqualified data includes data that has been unsuccessfully written on the disk and to be rewritten on the disk as a write retry.

7. The DSD of claim 1, wherein in transferring the unqualified data from the volatile memory to the NVSM, the controller is further configured to store metadata in the NVSM including addresses for the unqualified data.

8. The DSD of claim 1, wherein after power-up of the DSD following the unexpected power loss, the controller is further configured to control the head to write the unqualified data on the disk that was transferred to the NVSM before performing any commands involving the unqualified data.

9. The DSD of claim 1, wherein the NVSM includes a first segment for storing unqualified data transferred from the volatile memory after a previous unexpected power loss and a second segment for storing unqualified data transferred from the volatile memory after a current unexpected power loss.

10. A Data Storage Device (DSD), comprising:
    a disk for storing data;
    a head for writing data on the disk;
    a volatile memory for temporarily storing data to be written on the disk;
    a Non-Volatile Solid-State Memory (NVSM) for storing data; and
    a controller configured to:
       receive a write command including new data to be written in a physical sector on the disk or retrieve new data to be written in the physical sector from the NVSM or the disk;
       control the head to read runt data previously written in the physical sector;
       store at least the runt data in the volatile memory in preparation for writing the new data and the runt data in the physical sector;
       control the head to write the new data and the runt data in the physical sector;
       determine whether the new data and the runt data written in the physical sector are qualified as written; and
       in the event of an unexpected power loss before the new data and the runt data are qualified as written, transfer the runt data and any of the new data stored in the volatile memory from the volatile memory to the NVSM.

11. The DSD of claim 10, wherein the controller is further configured to maintain an indication of which data stored in the volatile memory has been qualified as written.

12. The DSD of claim 10, further comprising a servo system for controlling a position of the head in relation to the disk, and wherein the controller is further configured to determine whether the new data and the runt data written on the disk are qualified based on an indication from the servo system.

13. The DSD of claim 12, wherein the indication from the servo system indicates whether the new data and the runt data were written within a threshold distance from a center of a track on the disk.

14. The DSD of claim 10, wherein after power-up of the DSD following the unexpected power loss, the controller is further configured to control the head to write in the physical sector the runt data and any of the new data that was transferred to the NVSM before performing any commands involving the new data or the runt data.

15. A method for managing data stored in a Data Storage Device (DSD) including a disk for storing data, a volatile memory for temporarily storing data to be written on the disk, and a Non-Volatile Solid-State Memory (NVSM) for storing data, the method comprising:
    storing data in the volatile memory in preparation for writing the data on the disk;
    writing data from the volatile memory onto the disk;
    determining whether data written on the disk is qualified as written based on an indication from a servo system of the DSD for controlling a position of a head in relation to the disk; and in the event of an unexpected power loss, transferring a portion of unqualified data from the volatile memory to the NVSM, wherein the unqualified data has not been qualified as written.

16. The method of claim 15, wherein kinetic energy from a rotation of a spindle motor of the DSD for rotating the disk powers the NVSM after the unexpected power loss so as to facilitate the transfer of the unqualified data from the volatile memory to the NVSM.

17. The method of claim 15, further comprising maintaining an indication of which data stored in the volatile memory is qualified data.

18. The method of claim 17, further comprising:
writing data from the volatile memory in sectors on the disk; and
maintaining the indication of which data stored in the volatile memory is qualified data by keeping a count of sectors written on the disk that have been qualified as written.

19. The method of claim 15, wherein the indication from the servo system indicates whether the data was written within a threshold distance from a center of a track on the disk.

20. The method of claim 15, wherein the unqualified data includes data that has been unsuccessfully written on the disk and to be rewritten on the disk as a write retry.

21. The method of claim 15, wherein in transferring the unqualified data from the volatile memory to the NVSM, the method further comprises storing metadata in the NVSM including addresses for the unqualified data.

22. The method of claim 15, wherein after power-up of the DSD following the unexpected power loss, the method further comprises writing the unqualified data on the disk that was transferred to the NVSM before performing any commands involving the unqualified data.

23. The method of claim 15, wherein the NVSM includes a first segment for storing unqualified data transferred from the volatile memory after a previous unexpected power loss and a second segment for storing unqualified data transferred from the volatile memory after a current unexpected power loss.

24. A method for managing data stored in a Data Storage Device (DSD) including a disk for storing data, a volatile memory for temporarily storing data to be written on the disk, and a Non-Volatile Solid-State Memory (NVSM) for storing data, the method comprising:
receiving a write command including new data to be written in a physical sector on the disk or retrieving new data to be written in the physical sector from the NVSM or the disk;
reading runt data previously written in the physical sector;
storing at least the runt data in the volatile memory in preparation for writing the new data and the runt data in the physical sector; and
in the event of an unexpected power loss before determining that the new data and the runt data are qualified as written in the physical sector, transferring the runt data and any of the new data stored in the volatile memory from the volatile memory to the NVSM.

25. The method of claim 24, further comprising maintaining an indication of which data stored in the volatile memory has been qualified as written.

26. The method of claim 24, further comprising determining whether the new data and the runt data written on the disk are qualified based on an indication from a servo system of the DSD for controlling a position of a head in relation to the disk.

27. The method of claim 26, wherein the indication from the servo system indicates whether the new data and the runt data were written within a threshold distance from a center of a track on the disk.

28. The method of claim 24, wherein after power-up of the DSD following the unexpected power loss, the method further comprises writing in the physical sector the runt data and any of the new data that was transferred to the NVSM before performing any commands involving the new data or the runt data.

29. A Data Storage Device (DSD), comprising:
a disk for storing data;
a head for writing data on the disk;
a volatile memory for temporarily storing data to be written on the disk;
a Non-Volatile Solid-State Memory (NVSM) for storing data; and
a controller configured to:
store data in the volatile memory in preparation for writing the data on the disk;
control the head to write data from the volatile memory in sectors on the disk;
determine whether data written on the disk is qualified as written;
maintain an indication of which data stored in the volatile memory is qualified data by keeping a count of sectors written on the disk that have been qualified as written; and
in the event of an unexpected power loss, transfer a portion of unqualified data from the volatile memory to the NVSM, wherein the unqualified data has not been qualified as written.

30. A method for managing data stored in a Data Storage Device (DSD) including a disk for storing data, a volatile memory for temporarily storing data to be written on the disk, and a Non-Volatile Solid-State Memory (NVSM) for storing data, the method comprising:
storing data in the volatile memory in preparation for writing the data on the disk;
writing data from the volatile memory in sectors on the disk;
determining whether data written on the disk is qualified as written;
maintaining an indication of which data stored in the volatile memory is qualified data by keeping a count of sectors written on the disk that have been qualified as written; and
in the event of an unexpected power loss, transferring a portion of unqualified data from the volatile memory to the NVSM, wherein the unqualified data has not been qualified as written.

* * * * *